United States Patent [19]
Chiou et al.

[11] Patent Number: 5,606,015
[45] Date of Patent: Feb. 25, 1997

[54] POLYMER POWDER STABILITY

[75] Inventors: Shang J. Chiou; Miao-Hsun L. Sheng, both of Lower Gwynedd, Pa.

[73] Assignee: Rohm and Haas Company, Phila., Pa.

[21] Appl. No.: 390,389

[22] Filed: Feb. 16, 1995

[51] Int. Cl.$^6$ .................................................. C08F 6/14
[52] U.S. Cl. ..................... 528/495; 528/498; 528/502 E
[58] Field of Search ................... 528/495, 498, 528/502 E

[56] References Cited

U.S. PATENT DOCUMENTS

| | | | |
|---|---|---|---|
| 4,171,428 | 10/1979 | Kuhn | 528/494 |
| 4,203,879 | 5/1980 | DeWald . | |
| 5,342,897 | 8/1994 | Franzman et al. | 525/230 |
| 5,403,894 | 4/1995 | Tsai et al. | 525/285 |

FOREIGN PATENT DOCUMENTS

| | | |
|---|---|---|
| 239084 | 9/1987 | European Pat. Off. . |
| 601518 | 6/1994 | European Pat. Off. . |
| 4317036 | 11/1994 | Germany . |
| 185607 | 7/1992 | Japan . |
| 1525864 | 9/1978 | United Kingdom . |

*Primary Examiner*—Thomas R. Weber
*Attorney, Agent, or Firm*—David T. Banchik

[57] ABSTRACT

A method for improved polymer powder stability is provided, particularly spray-dried emulsion polymers, by spray-drying emulsion polymers with selected low HLB surfactants. Stable spray-dried emulsion polymers are particularly useful as cement modifiers.

5 Claims, No Drawings

POLYMER POWDER STABILITY

The present invention relates to improved polymer powder stability. In particular, the present invention relates to improved stability of spray-dried emulsion polymers.

Polymers are known to be useful in many physical forms including powders. Several methods are known for preparing powders of polymers. One of the more practical methods for preparing powders of emulsion polymers is by spray-drying a polymer emulsion. However, spray-drying emulsion polymers has some drawbacks. For example, the yield of powder product may be low.

Another drawback to many spray-dried emulsion polymers is the poor storage stability of the spray-dried emulsion polymers. Poor stability may be manifested by clumping of the powder. In certain applications, such as cement modification, it is desirable to have the polymer powder be redispersible in the cement formulation. Poor storage stability may also be indicated by the degradation of performance, as manifested by the lack of redispersibility of the spray-dried emulsion polymer in the cement formulation.

One method for attempting to overcome the problems associated with spray-drying redispersible emulsion polymers was to add polyvinyl alcohol to the emulsion prior to spray-drying as taught in European Patent Application Number 0601518A. When polyvinyl alcohol is added to cement modifier emulsion polymers, there is a tendency for phase separation. Also, the addition of polyvinyl alcohol to the emulsion tends to impart poor rheology characteristics of cement compositions containing this mixture.

The present invention seeks to overcome the problems associated with known methods for providing redispersible polymer powders.

The present invention provides a method comprising (i) providing an emulsion comprising at least one emulsion polymer and at least one surfactant having an HLB value below 7 wherein said surfactant is a nonionic surfactant selected from the group consisting of alkylphenoxy ethoxylates, acetylenic polyols, alkylene glycol alkylates, sorbitan alkalates, glycerol esters, polyglycerol esters, and combinations thereof; and (ii) spray-drying the emulsion.

The method of the present invention provides spray-dried polymers having improved storage stability and redispersibility. The method of the present invention also improves the amount of polymer which is recovered during the spray-drying process.

As used herein and in the appended claims, "HLB" refers to hydrophile-lipophile balance. Surfactants which have a low HLB tend to be less water-soluble and more oil-soluble than surfactants which have a higher HLB.

Surfactants suitable for the present invention are nonionic surfactants having HLB below 7, preferably below 6, more preferably below 5. Nonionic surfactants tend to produce less foam than other classes of surfactants. Surfactants useful in the present invention include, for example: alkylphenoxy ethoxylates such as octylphenoxy ethoxylated alcohols; acetylenic polyols such as ethoxylated tetramethyl decynediol; alkylene glycol alkylates such as propylene glycol monolaurate; sorbitan alkalates such as sorbitan monostearate and sorbitan oleate; glycerol esters such as glycerol oleate; polyglycerol esters such as decaglycerol decastearate and decaglycerol decaoleate; and combinations thereof; which have an HLB below 7, preferably below 6, more preferably below 5. Nonionic surfactants such as ethylene oxide/propylene oxide block copolymers, even if the HLB is below 7, do not provide the benefits of the present invention. For example, ethylene oxide/propylene oxide block copolymers tend to result in high levels of caking on the walls of the spray-drying chamber.

The surfactants useful in the present invention may be added prior to the polymerization of the emulsion polymers, during the polymerization of the emulsion polymers, after the polymerization of the emulsion polymers or a combination thereof. Preferably, the surfactants useful in the present invention are used as the emulsifier for the emulsion polymerization and are thus added prior to the polymerization of the emulsion polymers. The surfactants useful in the present invention may also be used in combination with one or more conventional surfactants useful in emulsion polymerization. The surfactants useful in the present invention are preferably used at a level of from 0.1 to 20, more preferably from 0.2 to 18, most preferably from 0.5 to 15 percent by weight based on the total weight emulsion polymer.

The various aspects of emulsion polymerization are well known to those skilled in the art, such as the selection of the type and amount of monomer(s) and initiator, the selection of the type and amount of chain transfer agents, the control of pH, the rate of addition of the various components, the polymerization temperature, the level of solids, the heating profile, and the like. When preparing emulsion polymers intended for use as cement modifiers, it is preferred that the emulsion polymers are core-shell emulsion polymers, preferably core-shell polymers of the type disclosed in European Patent Application No. EP 522791 A1.

The various aspects of spray-drying are also well known to those skilled in the art, such as the selection of flow rates, inlet temperatures, outlet temperature, residence time, the type and amount of additives and type of carrier gas.

Preferably, the emulsion polymers are prepared via an aqueous emulsion process. Preferably, the aqueous emulsion is from 25 to 70 percent by weight polymer solids, more preferably from 30 to 60 percent by weight polymer solids, and most preferably from 35 to 55 percent by weight polymer solids. Preferably, the viscosity of the aqueous emulsion of the present invention is below 5,000 centipoises ("cps"), more preferably from 50 to 2,000 cps to allow for easier handling and pumping the emulsion through the nozzle of the spray drier.

The emulsion polymers prepared by the present invention are useful in the form of an aqueous emulsion and as a spray-dried polymer powder. The use of low HLB surfactants does not present foaming problems when the low HLB surfactant is used as an emulsifier during the emulsion polymerization, the low HLB surfactant improves the yield of product upon spray-drying, and the low HLB surfactant improves the stability of the spray-dried polymer powder.

EXAMPLES

Polymer Synthesis

The following procedure was used to prepare core-shell polymers. The surfactants used in each of the examples are set forth in Table V, below.

To a 5 liter, 4-necked round bottom flask equipped with a mechanical stirrer, thermocouple, condenser, and nitrogen sparge was added 700 grams of deionized water. The water was heated to 80° C. A monomer emulsion (ME#1) was prepared by combining the components set forth in Table I below. An initiator solution was prepared by combining the components set forth in Table II below. While stirring the contents of the kettle, ME#1 was added to the kettle followed by the initiator solution. After several minutes, the temperature of the kettle leveled off, a few grams of a catalyst solution containing t-butylhydroperoxide and sodium sulfoxylate formaldehyde was added to the kettle to reduce the residual monomer level. To the kettle was added the neutralizer slurry (as shown in Table III below) to solubilize the first stage (shell) polymer.

A monomer emulsion (ME#2) was prepared by combining the components set forth in Table IV below. To the kettle was added 114 grams of ME#2 and 10 grams of a 20 percent aqueous solution of ammonium persulfate. After the exotherm peaked, the remainder of ME#2 and 187 grams of a 3.7 percent aqueous solution of ammonium persulfate were separately added to the kettle at a constant rate over a period of two hours at a temperature in the range of 82°–86° C. The contents of the kettle temperature were then maintained at 82° C. for an additional thirty minutes, then cooled to 65° C. Residual monomer levels were reduced by adding a few grams of a catalyst solution containing t-butylhydroperoxide and sodium sulfoxylate formaldehyde to the kettle.

The emulsion polymers were spray-dried in a Bowen Model BLSA spray dryer under the following conditions: Inlet temperature 120° C.; Outlet Temperature 60° C.; Flow Rate 100–150 milliliters per minute; Air Pressure 100 pounds per square inch. In each of the examples, "Particle Size" is reported as diameter in nanometers ("nm") as measured by a Brookhaven BI-90 Particle Sizer. The Scrap Ratio reported in Table VII below is the amount of spray dried emulsion polymer, by weight, recovered relative to the amount of polymer which adhered to the walls of the spray drying chamber. The spray-dried emulsion polymers were evaluated as cement modifiers. Cement mortars were prepared according to the formulation set forth in Table VI below.

The following properties of the modified cements were evaluated, and the results are set forth in Table VII below:
Wet-out time: the time required for the mortar to reach a very workable consistency, reported in seconds ("sec.").
Thin section properties: a 1/16 inch (0.16 centimeter) thickness of mortar is placed on plywood and allow to cure for 24 hours. Toughness is rated qualitatively by scratching the center with a screw driver. Adhesion is rated qualitatively by evaluating how well the cement adhered to the plywood.
"Fresh" polymer refers to spray dried emulsion polymer incorporated into the cement formulations within 2 days of being spray-dried.
"Aged" polymer refers to spray dried emulsion polymer which has been placed in an oven at 60° C. for 5 days prior to being incorporated into the cement formulations.

TABLE I

| Materials | ME #1 |
|---|---|
| Deionized water | 290.00 |
| Triton XN-45S | 1.3 |
| Surfactant | 35.60 |

TABLE I-continued

| Materials | ME #1 |
|---|---|
| Methyl Methacrylate | 294.00 |
| Allyl Methacrylate | 5.60 |
| Methacrylic Acid | 75.00 |
| Methyl 3-mercaptopropionate | 13.1 |

TABLE II

| | |
|---|---|
| 0.1 percent aqueous solution of FeSO$_4$.7 H$_2$O | 10.0 g |
| 14.9 percent aqueous solution of t-butyl hydroperoxide | 25.4 g |
| 7.8 percent aqueous solution of sodium sulfoxylate formaldehyde | 43.4 g |

TABLE III

| | |
|---|---|
| deionized water | 110.0 g |
| 50 percent aqueous solution of sodium hydroxide | 35.0 g |
| Ca(OH)$_2$ | 16.1 g |

TABLE IV

| Materials | ME #2 |
|---|---|
| Deionized water | 326.00 grams |
| Surfactant | 11.30 grams |
| sodium lauryl sulfate | 10.80 grams |
| Butyl Acrylate | 762.00 grams |
| Methyl Methacrylate | 739.00 grams |

TABLE V

| Example | Surfactant | HLB |
|---|---|---|
| 1 | Octylphenyl ethoxylated alcohol (1–2 EO units) | 3.6 |
| 2 | tetramethyl decylnediol | 4.0 |
| 3 | Ethoxylated tetramethyl decynediol | 4.0 |
| 4 | C12–13 linear primary alcohol ethoxylate | 3.7 |
| 5 | polyglycol monolaurate | 3.2 |
| Comparative 6 | Octylphenoxy ethoxylated alcohol (~16 EO units) | 15.8 |
| Comparative 7 | C 11–15 secondary alcohol ethoxylate | 8.0 |
| Comparative 8 | C 12–13 linear primary alcohol ethoxylate | 7.9 |
| Comparative 9 | Block copolymers of EO/PO | 1–7 |
| Comparative 10 | Block copolymers of EO/PO | 12–18 |

TABLE VI

| | |
|---|---|
| Type I Portland cement | 15.0 grams |
| 60 mesh sand | 22.5 grams |
| Spray dried emulsion polymer | 1.0 grams (based on polymer solids) |
| water | 6.0 grams |

TABLE VII

| Example | 1 | 2 | 3 | 4 | 5 | Comp. 6 | Comp. 7 | Comp. 8 | Comp. 9 | Comp. 10 |
|---|---|---|---|---|---|---|---|---|---|---|
| HLB | 3.6 | 4.0 | 4.0 | 3.7 | 3.2 | 15.8 | 8.0 | 7.9 | 1–7 | 12–18 |
| Particle size (nm) | 172 | 161 | 149 | 161 | 158 | 156 | 164 | 150 | 161 | 161 |

TABLE VII-continued

| Example | 1 | 2 | 3 | 4 | 5 | Comp. 6 | Comp. 7 | Comp. 8 | Comp. 9 | Comp. 10 |
|---|---|---|---|---|---|---|---|---|---|---|
| Scrap Ratio | 25.0 | 27.3 | 24.0 | 13.8 | 19.3 | 10.4 | 10.9 | 10.0 | 16.1 | 8.8 |
| Wet-out time (sec.) | 20 | 15 | 15 | 15 | 20 | 25 | 15 | 15 | 20 | 15 |
| Thin Section Toughness | | | | | | | | | | |
| Fresh | good | very good | very good | good | very good | poor | fair | fair | fair | poor |
| Aged | good/fair | good | good/fair | fair/poor | fair | very poor | poor | poor | good fair | very poor |
| Thin Section Adhesion | | | | | | | | | | |
| Fresh | good | very good | very good | good | good | fair | good | good | very good | fair |
| Aged | good | good | good | fair | fair-good | very poor | poor | poor | good | very poor |

The data in Table VII show, for example, that spray-dried polymer powders prepared from emulsions containing emulsion polymers and low HLB nonionic surfactants, namely alkylphenoxy ethoxylates, acetylenic polyols, or alkylene glycol alkylates, exhibit an improved balance of properties with regard to scrap ratio and stability.

We claim:

1. A method comprising
   (i) providing an emulsion comprising at least one emulsion polymer and at least one surfactant having an HLB value below 7 wherein said surfactant is a nonionic surfactant selected from the group consisting of alkylphenoxy ethoxylates, acetylenic polyols, alkylene glycol alkylates, sorbitan alkalates, glycerol esters, polyglycerol esters, and combinations thereof; and
   (ii) spray-drying the emulsion.

2. The method of claim 1, wherein the at least one surfactant has an HLB value below 6.

3. The method of claim 1, wherein the at least one surfactant has an HLB value below 5.

4. The method of claim 1, wherein the nonionic surfactant is selected from the group consisting of octylphenoxy ethoxylated alcohols, ethoxylated tetramethyl decynediol, propylene glycol monolaurate, sorbitan monostearate, sorbitan oleate, glycerol oleate, decaglycerol decastearate, decaglycerol decaoleate, and combinations thereof.

5. The method of claim 1, wherein the at least one surfactant is present at a level of from 0.5 to 15 percent by weight based on the total weight of said emulsion polymer.

* * * * *